United States Patent [19]

Delcorps et al.

[11] Patent Number: 5,006,377

[45] Date of Patent: Apr. 9, 1991

[54] IMPERMEABLE MEMBRANE RESISTANT TO CHEMICAL AGENTS AND IMPERMEABLE ENCLOSURE PRODUCED USING SUCH MEMBRANES

[75] Inventors: Michel Delcorps, Brussels; Hans Tanghe, Oudenaarde, both of Belgium

[73] Assignee: Plavina & Cie (Société en Nom Collectif), Belgium

[21] Appl. No.: 336,323

[22] Filed: Apr. 11, 1989

[30] Foreign Application Priority Data

Apr. 14, 1988 [FR] France ................................ 88 05064

[51] Int. Cl.$^5$ .......................... B65D 1/00; B32B 27/08
[52] U.S. Cl. .................................... 428/34.7; 428/215; 428/421
[58] Field of Search ............ 428/336, 461, 421, 474.4, 428/215, 192, 34.7, 35.7, 36.4, 476.9

[56] References Cited

U.S. PATENT DOCUMENTS

| | | | |
|---|---|---|---|
| 3,843,479 | 10/1974 | Matsunami | 428/336 |
| 3,971,865 | 7/1976 | Murakami et al. | 428/476.9 X |
| 4,229,567 | 10/1980 | Sharkey | 428/476.9 X |
| 4,749,625 | 6/1988 | Obayashi et al. | 428/461 X |

FOREIGN PATENT DOCUMENTS 814816 11/1974 Belgium .
2577564 8/1986 France .

Primary Examiner—Thomas J. Herbert
Attorney, Agent, or Firm—Spencer & Frank

[57] ABSTRACT

An impermeable membrane contains at least one flexible support layer made of a polymer containing chlorine, at least one adhesive layer consisting of a copolyamide whose degree of crystallization is less than 20% and a film of a polymer containing fluorine.

10 Claims, No Drawings

IMPERMEABLE MEMBRANE RESISTANT TO CHEMICAL AGENTS AND IMPERMEABLE ENCLOSURE PRODUCED USING SUCH MEMBRANES

BACKGROUND OF THE INVENTION

1. Field of the Invention

The present invention relates to an impermeable membrane having a multilayer structure which withstands attack by chemical agents exceptionally well, as well as to an impermeable enclosure produced by combination of a plurality of such membranes.

2. Description of the Related Art

It has already been proposed to produce impermeable membranes or films from flexible polymers containing chlorine, such as vinyl polymers, for example plasticized polyvinyl chloride, or chlorinated or sulphochlorinated polyolefins, or mixtures of these polymers.

It has, however, been found that such membranes, when used, in particular, for making enclosures insulating domestic or industrial waste from groundwater, are poor at withstanding the chemical agents released by the waste and rapidly lose their efficacy.

It is known, moreover, that sheets and films produced from polymers containing fluorine, such as, in particular, vinylidene fluoride homopolymers and copolymers, are characterized by an exceptional inertness with respect to most chemical agents.

Accordingly, for reasons of economy and efficacy with respect to the passage of time, it has also been proposed to produce impermeable membranes by combining a flexible support layer made of a polymer containing chlorine with at least one thin film of a polymer containing fluorine, the difficult problem to be solved in this case being, in view of the chemical inertness of polymers containing fluorine, to provide for effective and lasting bonding between these two constituents.

Thus, in Japanese Patent Application 126,598/81, published under No. 58,029,664, a coextruded multilayer complex film for agricultural applications is disclosed, in which a thin layer of polyvinylidene fluoride is combined with a support consisting of plasticized polyvinyl chloride with the participation of a layer of acrylic resin.

Moreover, in European Patent Application EP-A-0,164,766, a multilayer structure, in particular, is disclosed, containing a layer of vinylidene fluoride polymer combined with a support which can be made of plasticized polyvinyl chloride via an adhesive layer consisting of a copolymer of vinyl acetate and ethylene.

SUMMARY OF THE INVENTION

It has now been found that the use of certain copolyamides for combining, with one another, a flexible support made of a polymer containing chlorine and a film made of a polymer containing fluorine leads to structures possessing a further improved resistance to delamination. It is found, in particular, that the adhesion between the fluorinated polymer and the support layer is sufficient to permit an overall elongation greater than the elongation on necking of the fluorinated polymer alone, without separation or localized necking of the fluorinated polymer. This results in an economic advantage enabling the composite to be placed on deformable bedrocks.

The present invention hence primarily relates to an impermeable membrane containing at least one flexible support layer made of a polymer containing chlorine, at least one adhesive layer and at least one film of a polymer containing fluorine, in which the adhesive consists of a copolyamide whose degree of crystallinity is less than 20%.

The copolyamide used as adhesive is preferably a copolyamide based on piperazine or containing caprolactam, laurolactam and hexamethylenediamine adipate, as well as other polyamide-forming components as base constituents.

It is, however, preferable to employ a copolyamide whose melting point is below 120° C., such a copolyamide being obtained by choosing the other polyamide-forming components from the group consisting of 1,1-aminoundecanoic acid and/or the salts of hexamethylenediamine with adipic, azelaic, sebacic, dodecanedicarboxylic and/or undecanedicarboxylic acids.

Especially suitable copolyamides are described in detail in the documents BE-A-814,816, BE-A-814,817, DE-A-1,253,449, DE-A-1,595,591, DE-A-2,630,114 and DE-A-2,800,149, which are incorporated by reference in the present description.

A more especially suitable copolyamide for producing the membrane according to the invention is produced and marketed under the trademark PLATILON $H_2$ by the firm PLATE BONN GmbH.

The polymer containing chlorine employed for producing the flexible support layer or layers can be a plasticized homopolymer or copolymer of vinyl chloride or a chlorinated or sulphochlorinated polyolefin or alternatively a mixture of these.

Vinyl chloride copolymers are understood to mean a copolymer containing at least 50% by weight of units derived from vinyl chloride, it being possible for the copolymerized comonomer or comonomers to be chosen from vinyl esters, for example vinyl acetate; vinyl ethers, for example ethyl vinyl ether; acrylic and methacrylic acids and their esters, for example methyl acrylate; fumaric acid and its esters, for example ethyl fumarate; maleic acid, its anhydride and its esters, for example ethyl maleate; vinylaromatic compounds, for example styrene; vinylidene halides, for example vinylidene chloride; acrylonitrile; methacrylonitrile; and olefins, for example ethylene.

In an embodiment which is preferred, the polymer containing chlorine is a plasticized homopolymer of vinyl chloride.

Plasticized homopolymer of vinyl chloride is understood to mean a homopolymer containing from 10 to 90 parts by weight, per 100 parts by weight of homopolymer, of at least one traditional plasticizer for polyvinyl chloride, this plasticizer or these plasticizers generally being chosen from phthalic acid esters derived from a linear or branched alcohol containing from 4 to 12 carbon atoms, such as dibutyl, dioctyl and diisodecyl phthalate, for example; from esters of aliphatic diacids, such as dioctyl fumarate, dioctyl adipate and dibutyl sebacate, for example; from polyol esters such as pentaerythritol esters and diethylene and dipropylene glycol dibenzoates, for example; from fatty acid esters such as methyl acetylricinoleate for example; from phosphoric acid esters such as tricresyl, triphenyl and trinonyl phosphate, for example; from epoxidized oils such as epoxidized soybean and linseed oils, for example; from citric acid esters such as acetyltrioctyl and acetyltributyl citrates, for example; from polyester-based plasticizers such as trimethyl trimellitate, tetra-n-octyl pyromellitate and propylene glycol adipate, for example, and polymeric plasticizers such as polyadipates; or alternatively from phenol and/or cresol sulphonates such as phenol cresol pentadecanesulphonate.

On grounds of availability and cost, the plasticizer or plasticizers is/are preferably chosen from phthalic acid esters and from esters of aliphatic diacids, especially dioctyl and diisodecyl phthalate on the one hand, and dioctyl fumarate and adipate on the other hand.

The polymer containing chlorine can also contain other traditional additives for improving various properties, such as resistance to atmospheric agents and stability, or for facilitating its manufacture or reducing its cost, such as thermal stabilizers, lubricants, antistatic agents, filling or strengthening materials, flame-retardant agents, fungicidal agents, antioxidants, pigments, colourings, and the like.

In addition, each flexible support layer made of polymer containing chlorine can optionally be strengthened with a reinforcement made of natural, mineral or synthetic fibres, this reinforcement preferably being embedded in the strengthened layer.

The polymer containing fluorine employed for producing each film of the membrane according to the invention can be a homopolymer or copolymer of vinyl or vinylidene fluoride or of polytetrafluoroethylene or polychlorotrifluoroethylene, or alternatively a copolymer of ethylene and tetrafluoroethylene or chlorotrifluoroethylene. It is, however, preferable to use a vinylidene fluoride polymer.

Vinylidene fluoride polymer is understood to denote all polymers containing at least 85 mol %, and preferably at least 90 mol %, of monomeric units derived from vinylidene fluoride, the complement, where appropriate, preferably consisting of monomeric units derived from other fluorinated olefins such as vinyl fluoride, trifluoroethylene, chlorotrifluoroethylene, tetrafluoroethylene and hexafluoropropylene.

In the preferred embodiment of the impermeable membrane according to the invention, the polymer containing fluorine is a vinylidene fluoride homopolymer.

The polymer containing fluorine can also contain customary additives, and in particular agents absorbing ultraviolet radiation, pigments and/or colourings.

The impermeable membrane can, in a first embodiment, consist of a combination, in succession, of a flexible support layer made of polymer containing chlorine, an adhesive layer and a film of polymer containing fluorine. In this case, it is advantageous, as will be shown later, to apply an additional layer of adhesive at least to the edges of the free face of the flexible support layer made of polymer containing chlorine.

For some applications, the impermeable membrane according to the invention can have a sandwich structure, the core consisting of the flexible support layer made of polymer containing chlorine and being coated on both faces with an adhesive layer and then with a film of polymer containing fluorine.

Finally, in some cases, it can be advantageous to produce an impermeable membrane containing a flexible support layer coated on both faces with adhesive and provided, in addition, on only one face with a film made of polymer containing fluorine. In this case, the function of the free layer of adhesive is to prevent a migration or exudation of the plasticizer or plasticizers present in the flexible support layer.

In the impermeable membrane according to the invention, each flexible support layer has a thickness of between 0.1 and 3 mm, and preferably between 0.3 and 2 mm, each adhesive layer has a thickness of between 0.01 and 0.5 mm, and preferably between 0.02 and 0.3 mm, and each film made of resin containing fluorine has a thickness of between 0.01 and 3 mm, and preferably between 0.05 and 2 mm.

The method of production of the impermeable membrane is not critical per se.

Thus, the membrane may be produced by coextrusion or by hot rolling of its various constituents. According to another method of production, a layer of adhesive, as a powder or in solution, can be deposited on the flexible support layer, and the film made of polymer containing fluorine can then be applied by hot pressing, for example by passage between hot rollers.

When a process of hot assembling between the components forming the membrane is employed, the working temperature is generally above the melting point of the adhesive but below the melting point of the film made of polymer containing fluorine, and is preferably between 130° and 175° C. In general, the pressures exerted in the assembling processes can vary between 0.02 and 20 bars.

To produce impermeable enclosures using the membrane according to the invention, it suffices to contrive between them a plurality of adjacent membranes, it being possible for the joining to be carried out by butt jointing or by overlapping, taking care to form a continuous layer resistant to chemical attack on at least one of the faces of the enclosure.

According to an advantageous embodiment which can be employed with impermeable membranes containing a flexible support layer, an adhesive layer and a film made of polymer containing fluorine, the free face of the support layer being, in addition, provided on its edges with a layer of adhesive, the joining between adjacent membranes can be carried out by overlapping, making use of the marginal layer of adhesive. To this end, it is possible to use traditional welding equipment, such as hot air apparatuses, adjusting them so as to obtain a temperature of the faces to be welded of between 130° and 175° C.

DESCRIPTION OF THE PREFERRED EMBODIMENTS

The membrane according to the invention is, in addition, illustrated by the 6 examples of embodiment given below and noted in Table I.

In all the examples, the membrane was produced by hot pressing, in a press, a flexible support layer, a film of adhesive (PLATILON H$_2$) and a film of PVDF (vinylidene fluoride homopolymer produced and marketed by SOLVAY et Cie under the brand name SOLEF® 1008).

The flexible support layer in Examples 1 to 4 is made of a plasticized homopolymer of vinyl chloride, produced and marketed by SOLVAY et Cie under the brand name ALKORPLAN® 35070.

The flexible support layer in Example 5 is based on chlorinated polyethylene (CPE).

The flexible support layer in Example 6 is made of sulphochlorinated ethylene (HYPALON®).

In Examples 1 to 6, the peel strength was measured on a dynamometer according to a method based on ASTM standard D 1876-72, the measurements being performed on samples maintained at 23° C.

TABLE I

| EX. | IDENTIFICATION OF THE CONSTITUENTS AND THICKNESS | | T° C. | PRESSURE BARS | TIME SECONDS | PEEL STRENGTH N/5 CM | AND OBSERVATION |
|---|---|---|---|---|---|---|---|
| 1 | PVC<br>PLATILON H$_2$<br>PVDF | 1,5 mm<br>0,035 mm<br>0,06 mm | 160 | 0,02 | 30 | 100 | The PVDF film tears when the value is higher |
| 2 | PVC<br>PLATILON H$_2$<br>PVDF | 1,5 mm<br>0,035 mm<br>0,1 mm | 163 | 0,02 | 30 | 200 | The PVDF film tears when the value is higher |
| 3 | PVC<br>PLATILON H$_2$<br>PVDF | 1,5 mm<br>0,035 mm<br>0,15 mm | 163 | 0,02 | 30 | 250 | The PVDF film tears when the value is higher |
| 4 | PVC<br>PLATILON H$_2$<br>PVDF | 1,5 mm<br>0,035 mm<br>0,15 mm | 176 | 0,02 | 30 | 120 | The PVDF film tears when the value is higher |
| 5 | CPE<br>PLATILON<br>PVDF | 1,5 mm<br>0,035 mm<br>0,15 mm | 163 | 0,02 | 30 | 250 | |
| 6 | HYPALON ®<br>PLATILON H$_2$<br>PVDF | 1 mm<br>0,035 mm<br>0,1 mm | 165 | 0,05 | 60 | 182 | The PVDF film tears when the value is higher |

What is claimed is:

1. An impermeable membrane which is resistant to chemical agents, the impermeable membrane comprising, in succession:
   at least one flexible support layer comprised of a polymer containing chlorine;
   at least one adhesive layer consisting essentially of a copolyamide having a degree of crystallinity which is less than 20% and which is produced by reacting (a) one of piperazine or caprolactam, (b) laurolactam, (c) hexamethylenediamine adipate, and (d) at least one other polyamide-forming substance selected from the group consisting of 1,1-aminoundecanoic acid and salts of hexamethylenediamine with at least one acid selected from the group consisting of adipic, azelaic, sebacic, dodecanedicarboxylic or undecanedicarboxylic acids; and
   at least one film comprised of a polymer containing fluorine.

2. The impermeable membrane according to claim 1, wherein each of said at least one flexible support layer comprised of a polymer containing chlorine further comprises a fibrous reinforcement means comprised of a fiber selected from the group consisting of natural, mineral, and synthetic fibres.

3. The impermeable membrane according to claim 1, wherein the polymer containing chlorine is selected from the group consisting of polymers based on vinyl chloride, chlorinated polyolefins and sulphochlorinated polyolefins, and mixtures thereof.

4. The impermeable membrane according to claim 1, wherein the polymer containing chlorine is a homopolymer of vinyl chloride and is plasticized.

5. The impermeable membrane according to claim 1, wherein the polymer containing fluorine is selected from the group consisting of vinylidene fluoride homopolymers and vinylidene fluoride copolymers.

6. The impermeable membrane according to claim 1, each of said at least one flexible support layer comprised of a polymer containing chlorine has a thickness ranging between 0.1 and 3 mm, each of said at least one adhesive layer has a thickness ranging between 0.01 and 0.5 mm, and each of said at least one film comprised of a polymer containing fluorine has a thickness ranging between 0.01 to 3 mm.

7. The impermeable membrane according to claim 1, comprising, in succession:
   one said at least one flexible support layer comprised of a polymer containing chlorine and having a free face, edges, and a zone proximate the edges thereof;
   one said at least one adhesive layer; and
   one said at least one film comprised of a polymer containing fluorine,
   wherein the free face of said one said at least one flexible support layer is coated with said layer of adhesive at least on the zone proximate the edges thereof.

8. An impermeable enclosure produced by a process comprising:
   overlapping at least partially opposing faces of the impermeable membrane according to claim 7 to provide an overlapped zone, the opposing faces being overlapped including the free face of the one flexible support layer comprised of a polymer containing chlorine which is coated with a layer of adhesive at least on the zone proximate the edges thereof; and
   heat sealing the opposing faces of the overlapped zone to one another.

9. The impermeable enclosure according to claim 8, wherein heat sealing is performed at an interfacial temperature above the melting point of the adhesive coated on the free face but below the melting point of the one said at least one film comprised of a polymer containing fluorine.

10. The impermeable enclosure according to claim 9, wherein heat sealing is performed at an interfacial temperature ranging between 130° and 175° C.

* * * * *